(12) United States Patent
Casado Montero et al.

(10) Patent No.: US 9,452,833 B2
(45) Date of Patent: Sep. 27, 2016

(54) DRAINAGE MAST OF THE COMPARTMENT OF AN AIRCRAFT SUBJECTED TO A NEGATIVE PRESSURE

(71) Applicant: Airbus Operations S.L., Getafe, (Madrid) (ES)

(72) Inventors: Carlos Casado Montero, Getafe (ES); Jose Angel Hernanz Manrique, Getafe (ES); Jose Grana Otero, Getafe (ES); Ignacio Esteban Parra Fabian, Getafe (ES); Miguel Angel Gallego Lorenzo, Getafe (ES)

(73) Assignee: Airbus Operations S.L., Getafe (ES)

( * ) Notice: Subject to any disclaimer, the term of this patent is extended or adjusted under 35 U.S.C. 154(b) by 123 days.

(21) Appl. No.: 14/336,085

(22) Filed: Jul. 21, 2014

(65) Prior Publication Data

US 2015/0021438 A1    Jan. 22, 2015

(30) Foreign Application Priority Data

Jul. 22, 2013 (EP) ..................................... 13382293

(51) Int. Cl.
*B64D 1/00* (2006.01)
*B64D 1/16* (2006.01)
*B64C 1/14* (2006.01)

(52) U.S. Cl.
CPC .............. *B64D 1/16* (2013.01); *B64C 1/1453* (2013.01)

(58) Field of Classification Search
CPC ............................... B64C 1/1453; B64D 1/16
USPC ................................................... 244/58, 136
See application file for complete search history.

(56) References Cited

U.S. PATENT DOCUMENTS

| | | | |
|---|---|---|---|
| 5,655,732 A * | 8/1997 | Frank | ..................... B64C 1/1453 239/171 |
| 5,996,938 A | 12/1999 | Simonetti | |
| 2013/0193271 A1 * | 8/2013 | Otero | ..................... B64C 1/1453 244/136 |

FOREIGN PATENT DOCUMENTS

| | | |
|---|---|---|
| DE | 102010010167 | 9/2011 |
| EP | 2620361 | 7/2013 |

OTHER PUBLICATIONS

European Search Report, Nov. 28, 2013.

* cited by examiner

*Primary Examiner* — Christopher P Ellis
*Assistant Examiner* — Richard G Davis
(74) *Attorney, Agent, or Firm* — Greer, Burns & Crain Ltd.

(57) ABSTRACT

A drainage mast able to drain effectively the liquid contained in the compartment of an aircraft when the pressure within the compartment is lower than the outside pressure without using any pressure control active device and without causing any significant perturbation to the aerodynamic behavior of the aircraft. The drainage mast is configured with a cross section area decreasing from its entry section to the compartment to its outlet section and is disposed at an acute angle α relative to the compartment in the airflow direction. The entry and outlet sections have two perpendicular symmetry axes of different length, the entry section is arranged with its longer axis of symmetry substantially parallel to the airflow direction. The drainage mast has a symmetrical configuration with respect to a plane substantially perpendicular to the fuselage envelope passing through the longer axis of symmetry of the entry section.

6 Claims, 2 Drawing Sheets

DRAINAGE MAST OF THE COMPARTMENT OF AN AIRCRAFT SUBJECTED TO A NEGATIVE PRESSURE

CROSS-REFERENCES TO RELATED APPLICATIONS

This application claims the benefit of the European patent application No. 13382293.2 filed on Jul. 22, 2013, the entire disclosures of which are incorporated herein by way of reference.

FIELD OF THE INVENTION

The present invention relates to drainage masts of aircraft compartments subjected to a negative pressure such as the compartment of the Auxiliary Power Unit or an engine nacelle.

BACKGROUND OF THE INVENTION

Known drainage systems of the Auxiliary Power Unit (APU) of an aircraft comprise a mast for evacuating any liquid accumulated in the APU compartment to the atmosphere by gravity.

One of the effects of the ventilation of the APU compartment typically induced by a jet pump mechanism generated by the APU itself is a depression (lower pressure in the APU compartment than outside) generated in the APU compartment.

Some of the drawbacks of a pressure impact in the drainage system are mainly related to the difficulties in priming the drainage mast. That is, the draining capacity of the mast is sufficient once it is working fully filled with liquid, but if the ingestion of air into the APU compartment starts before the mast is filled with liquid, because there is a lower pressure in the APU compartment than outside, the stresses induced by the air flow impede the flow of liquid, and it may well happen that the mast never gets filled or primed. Rather, typically, air entering the APU compartment almost completely prevents any outflow of liquid until the liquid height inside the APU compartment is enough to balance the suction in the APU compartment, rendering the mast ineffective. Once this height is reached, only a reduced cross section of the mast will be useful for draining and, in addition, the liquid height in the APU compartment will be as large as what would be reached without a drainage mast.

U.S. Pat. No. 5,996,938 proposes a drainage system comprising a drain tube which is in fluid communication at its upper end with a liquid collecting floor and at its lower end to a check valve selectively open and placed as closely as possible to the aircraft overboard drain port. Liquids collected by the collecting floor are gravitationally directed into the drain tube upper end. The check valve is configured to be open to fluid drainage from the tube out of the drain port when the pressure head of fluid upstream of the check valve exceeds fluid pressure at the drain port due to aircraft operating conditions. This drainage system is therefore dependent of the said check-valve.

SUMMARY OF THE INVENTION

An object of the present invention is to provide a drainage mast able to effectively drain the liquid contained in the compartment of an aircraft when the pressure within the compartment is less than the outside pressure and also when the opposite happens without using any pressure control active device and without causing any significant perturbation to the aerodynamic behavior of the aircraft.

To fulfill this object, the drainage mast of the invention has the following features:

- Is configured with a cross section area decreasing from its entry section to the compartment to its outlet section and is disposed at an acute angle α relative to the compartment in the airflow direction. This favors priming the mast when the pressure inside the compartment is below atmospheric pressure.
- The entry and outlet sections have two perpendicular symmetry axes of different length, the entry section is arranged with its longer axis of symmetry substantially parallel to the airflow direction and the drainage mast has a symmetrical configuration with respect to a plane substantially perpendicular to the fuselage envelope passing through the longer axis of symmetry of the entry section. This configuration minimizes the drag of the drainage mast.
- The ratio between the shorter axis and the longer axis of the outlet section is between 0.2 and 0.6. This feature is essential to have the draining mast operatively primed.

In an embodiment, the outlet section is arranged in a plane forming an angle β between 60-120° (preferably 70-85°) with the plane of the entry section, with its longer axis parallel to the plane of the entry section and perpendicular to its longer axis in a projection over said plane. This feature improves the drainage mast priming because the airflow contributes positively to it having the outlet section in that position.

Another important feature of the invention is that it provides a ratio between the areas of the outlet section and the entry section which optimizes the fluid drainage. That ratio is the one in which the value of the flow rate Qreq required to evacuate a predetermined volume of liquid in the compartment and the value of flow rate Qprim evacuated by the drainage mast, when is fully primed, match.

Other desirable features and advantages of the invention will become apparent from the subsequent detailed description of the invention and the appended claims, in relation with the enclosed drawings.

DETAILED DESCRIPTION OF THE PREFERRED EMBODIMENTS

Figure 1:
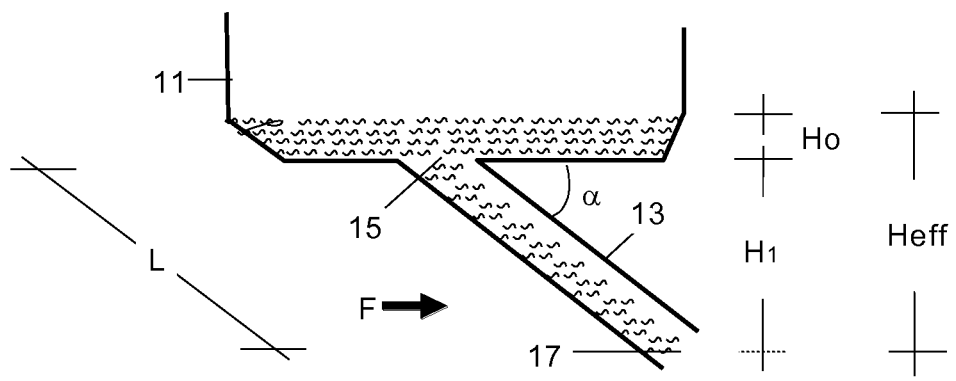
FIG. 1 is a schematic side view of a known drainage system of an APU compartment of an aircraft.

FIG. 1 illustrates a drainage mast 13 of a compartment 11 of an aircraft where liquids are accumulated with an entry section 15 connected to a bottom zone of the compartment 11 and with an outlet section 17 for discharging said liquids to the atmosphere.

As shown in FIG. 1, the drainage mast 13 is usually arranged at an acute angle α with respect to the compartment 11 in the airflow direction (arrow F).

The length L of the drainage mast 13 and the inclination angle α with respect to the plane of the entry section 15 controls the effective height Heff of the liquid in the compartment 11 according to the equation:

$$\rho g H_{eff} = \rho g (H_o + L \sin(\alpha)) = P_{out} - P_{in}$$

where:

ρ: liquid density at ambient conditions;
g: gravity acceleration;
Heff: liquid height in the compartment 11 measured from the outlet section 17 of the drainage mast 13;
Pout: pressure outside of the compartment 11 (atmospheric pressure);
Pin: pressure inside of the compartment 11.

On the other hand, Ho is the liquid height in the compartment 11 measured from the entry section 15 of the drainage mast 13.

As already stated in the background of the invention if Pin<Pout may occur the situation shown in FIG. 1 in which the mast 13 is not completely primed because Ho is not enough to compensate for the pressure difference between Pin and Pout.

To achieve effective drainage of the compartment 11 when the pressure inside Pin is lower than the pressure outside Pout, the present invention proposes to configure the drainage mast with sections of a decreasing area from the entry section 15 toward the outlet section 17, the configuration complying with certain geometric conditions.

The progressive decrease in the area of the cross section of the drainage mast 13 favors its priming because the flow rate supported upstream of a particular intermediate section is larger than it can accommodate favoring the accumulation of fluid upstream of said intermediate section and therefore its priming. Thus air is prevented from entering the compartment 11 and the problem posed by liquid splashing inside the compartment 11 is solved. Complete priming of drainage mast 13 occurs when Heff is large enough to compensate for the pressure difference between Pin and Pout.

Figure 2:
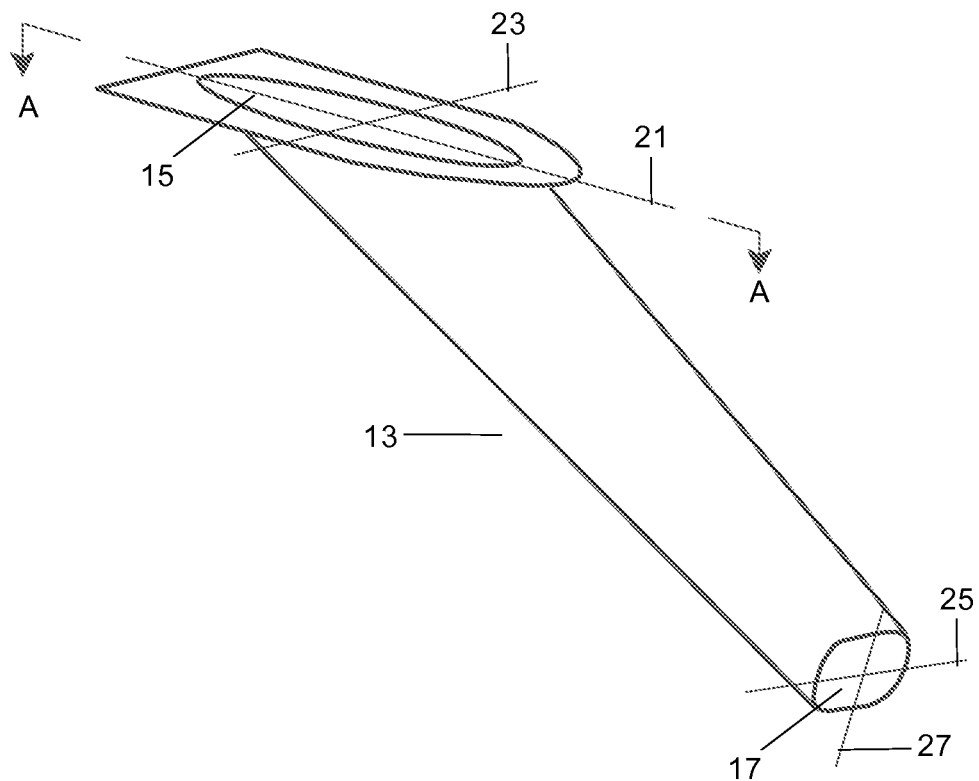
FIG. 2 is a schematic perspective view of the drainage mast of the invention.
Figure 3:
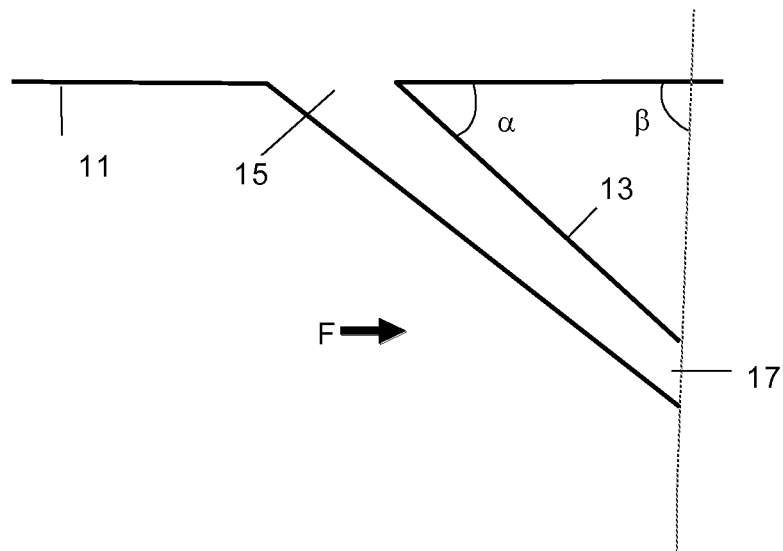
FIG. 3 is a cross sectional view along the plane of symmetry of the drainage mast of FIG. 2.

In the embodiment shown in FIGS. 2 and 3, the entry section 15 has an elliptical shape with axes of symmetry 21, 23 (axis 21 being longer than axis 23), the outlet section 17 has a dome-ended rectangular shape with symmetry axes 25, 27 (axis being 25 longer than axis 27) and the intermediate sections between them which are configured so that the outer surface of drainage mast 13 is as smooth as possible.

The ratio between the shorter symmetry axis 27 and the longer symmetry axis 25 of the outlet section 17 is between 0.2 and 0.6. The inventor has found that a drainage mast 13 having an outlet section 17 configured within this range provides good priming results. Said ratio is applicable to any geometrical shape of the outlet section 17 and particularly to elliptical, oval and dome-ended rectangular shapes. The drainage mast 13 is symmetrical about a plane A-A substantially perpendicular to the fuselage envelope passing through the longer symmetry axis 21 of the entry section 15 and the outlet section 17 is disposed in a plane forming an angle β between 60-120° (preferably between 70-85°) with the plane of the entry section 15.

An important aspect of the present invention is the ratio R between the area of the outlet section 17 and the area of entry section 15.

The flow rate Qreq that is necessary to evacuate a given volume of liquid by the outlet section 17 of the drainage mast 13 is given by the following formula:

$$* \sqrt{\frac{2}{1 + C_{LOSS}} * \Delta P} \, )$$

where $\Delta P = (P \downarrow in - P \downarrow out)/(+g*(H \downarrow 0 + H \downarrow 1)$ being H1=Lsenα

$A_{out}$ area of outlet section 17
$C_{eff}$ coefficient of effective area of outlet section 17
$C_{LOSS}$ coefficient of losses in the drainage mast 13

Thus the flow rate Qreq does not depend from ratio R.

On the other hand, the discharge time is obtained in an iterative calculation applying the formula T=Volume/Qreq and using 0.1 second intervals. It is started with the volume of fluid accumulated in the compartment 11 when the drainage mast 13 is primed. Qreq is a function of $H_0+H_1$, therefore to find the new value of $H_0$ for each iteration the liquid evacuated in the previous 0.1 second interval is subtracted from the previous Volume. The iterative process is continued until $H_0+H_1=0$ and the total iteration time Ttot is the time required for the complete evacuation of the liquid.

Figure 4:
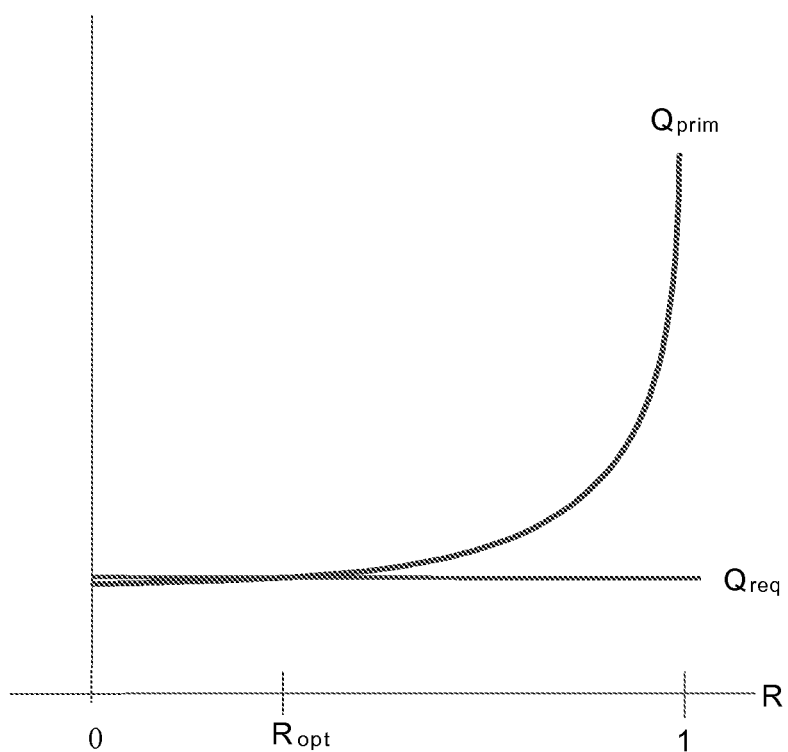
FIG. 4 is a diagram showing the variation of the flow rates Qprim and Qreq as a function of the ratio R between the outlet and entry sections of the drainage mast.

The optimum value Ropt of ratio R is the one in which the value Qreq matches the value of the function Qprim (see FIG. 4) which sets the flow rate discharged through the outlet section 17 when the drainage mast 13 is primed which is given by the following formula:

$$Q_{prim} = \frac{p_C * A_{out} * \sqrt{g * H_1}}{\sqrt{1 + R^2}}$$

where $p_c$ is the primed coefficient of the oscillation of the liquid in the drainage mast 13.

For ratios R smaller than Ropt, Ho and Ttot are greater that their optimum values and the same happens for ratios R greater than Ropt because the drainage mast 13 is not primed.

The above calculations have been made assuming that the volume to evacuate is known. If the drainage mast were subjected to different discharge volumes, the ratio R would be established for that volume that would provide the best results for all of them.

Although the present invention has been described in connection with various embodiments, it will be appreciated from the specification that various combinations of elements, variations or improvements therein may be made, and are within the scope of the invention.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A drainage mast to drain fluids from one compartment of an aircraft into the atmosphere by gravity even when the pressure in the compartment is below atmospheric pressure, the drainage mast being disposed at an acute angle α with respect to the compartment in an airflow direction and configured with a cross section having a decreasing area from its entry section in the bottom zone of the compartment to its outlet section, the drainage mast further comprising:

entry and outlet sections each having two perpendicular axes of symmetry of different length;

the entry section being arranged with its longer axis of symmetry substantially parallel to the airflow direction;

a symmetrical configuration with respect to a plane substantially perpendicular to a fuselage envelope, passing through the longer axis of symmetry of the entry section;

the ratio between the shorter axis and the longer axis of the outlet section being between 0.2 and 0.6, the outlet section being arranged with its longer axis of symmetry substantially perpendicular to the airflow direction.

2. The drainage mast according to claim 1, wherein the outlet section is disposed in a plane forming an angle β between 60-120° with a plane of the entry section, a longer axis of the outlet section being parallel to the plane of the entry section and a projection of the outlet section over said plane of the entry section being perpendicular to the longer axis of the entry section.

3. The drainage mast according to claim 2, wherein the angle β is between 70-85°.

4. The drainage mast according to claim, 1 wherein the entry section has an elliptical shape and the outlet section has one of an elliptical, oval and dome-ended rectangular shape.

5. A drainage mast to drain fluids from one compartment of an aircraft into the atmosphere by gravity even when the pressure in the compartment is below atmospheric pressure, the drainage mast being disposed at an acute angle α with respect to the compartment in an airflow direction and configured with a cross section having a decreasing area from its entry section in the bottom zone of the compartment to its outlet section, the drainage mast further comprising:

entry and outlet sections each having two perpendicular axes of symmetry of different length;

the entry section being arranged with its longer axis of symmetry substantially parallel to the airflow direction;

a symmetrical configuration with respect to a plane substantially perpendicular to a fuselage envelope, passing through the longer axis of symmetry of the entry section;

the ratio between the shorter axis and the longer axis of the outlet section being between 0.2 and 0.6, wherein the areas of the outlet section and the inlet section have values such that the ratio between them is one in which the value of the flow rate needed to evacuate a predetermined volume of liquid in the compartment and the value of the flow rate evacuated by the drainage mast, when is fully primed, match.

6. An aircraft having a drainage mast to drain fluids from one compartment of the aircraft into the atmosphere by gravity even when the pressure in the compartment is below atmospheric pressure, the drainage mast being disposed at an acute angle α with respect to the compartment in the airflow direction and configured with a cross section having a decreasing area from its entry section in the bottom zone of the compartment to its outlet section, the drainage mast further comprising:

entry and outlet sections each having two perpendicular axes of symmetry of different length;

the entry section being arranged with its longer axis of symmetry substantially parallel to the airflow direction;

a symmetrical configuration with respect to a plane substantially perpendicular to the fuselage envelope, passing through the longer axis of symmetry of the entry section;

the ratio between the shorter axis and the longer axis of the outlet section being between 0.2 and 0.6, the outlet section being arranged with its longer axis of symmetry substantially perpendicular to the airflow direction.

* * * * *